(12) United States Patent
Li

(10) Patent No.: US 8,350,930 B2
(45) Date of Patent: *Jan. 8, 2013

(54) IMAGE CAPTURING DEVICE AND IMAGE SYNTHESIS METHOD THEREOF

(75) Inventor: Yun-Chin Li, New Taipei (TW)

(73) Assignee: Altek Corporation, Hsinchu (TW)

( * ) Notice: Subject to any disclaimer, the term of this patent is extended or adjusted under 35 U.S.C. 154(b) by 108 days.

This patent is subject to a terminal disclaimer.

(21) Appl. No.: 13/017,142

(22) Filed: Jan. 31, 2011

(65) Prior Publication Data
US 2012/0120279 A1  May 17, 2012

(30) Foreign Application Priority Data
Nov. 12, 2010  (TW) ................................ 099138917

(51) Int. Cl.
*H04N 5/262* (2006.01)
*H04N 5/235* (2006.01)

(52) U.S. Cl. ...................... 348/239; 348/229.1; 348/362

(58) Field of Classification Search ............. 348/207.99, 348/222.1, 229.1, 234, 239, 254–256, 350, 348/362–366
See application file for complete search history.

(56) References Cited

U.S. PATENT DOCUMENTS

| | | | |
|---|---|---|---|
| 2001/0007473 A1* | 7/2001 | Chuang et al. | 348/362 |
| 2004/0207734 A1* | 10/2004 | Horiuchi | 348/229.1 |
| 2007/0292048 A1* | 12/2007 | Choe et al. | 382/286 |
| 2009/0015690 A1* | 1/2009 | Yamashita | 348/229.1 |
| 2012/0120263 A1* | 5/2012 | Li et al. | 348/208.4 |

* cited by examiner

*Primary Examiner* — Tuan Ho
*Assistant Examiner* — Zhenzhen Wu
(74) *Attorney, Agent, or Firm* — Wang Law Firm, Inc.; Li K. Wang; Stephen Hsu

(57) ABSTRACT

The present invention discloses an image capturing device and an image synthesis method thereof. The image capturing device comprises an image capturing module, an exposure module, and a processing module. The image capturing module captures a high bit-depth scene image corresponding to a scene. The exposure module meters the light of the scene to generate a plurality of histograms. The processing module calculates a plurality of discrete values of different exposure conditions of the high bit-depth scene image based on the plurality of histograms, processes the high bit-depth scene image to generate at least two low bit-depth temporary images in different brightness conditions based on at least two highest discrete values, and synthesizes the at least two low bit-depth temporary images in different brightness conditions to generate a high dynamic range image.

10 Claims, 7 Drawing Sheets

IMAGE CAPTURING DEVICE AND IMAGE SYNTHESIS METHOD THEREOF

FIELD OF THE INVENTION

The exemplary embodiment(s) of the present invention relates to an image capturing device and an image synthesis method thereof. More specifically, the exemplary embodiment(s) of the present invention relates to an to an image capturing device and image synthesis method which enables several brightness analysis for the shooting scene to further synthesize a high dynamic range image.

BACKGROUND OF THE INVENTION

High dynamic range (HDR) file is a special image file format and each pixel comprises the information of RGB and the real brightness of the point. Generally, the grey scale of each pixel of the image file ranging only from 0 to 255 is not enough because the difference between the brightness scale/grey scale of the sun and a black object is much more than 256. The cloud and the sun in a common daytime scene image might be presented in the same grey scale/brightness scale (as pure white), but in fact there is a huge difference between the brightness scale of the cloud and the sun. Thus, the common image file format doesn't precisely record the true situation in the real world.

High dynamic range refers to the relative ratio between the lightest and darkest area of a scene. The brightness of the actual scene recorded by the high dynamic range image is over than 256 levels but the area which exceeds can't be seen on the display. For example, while opening an image with the scene from the indoor to the outside of the window in Photoshop, the outside area of the window shows a plenty of white color without many details due to the overexposure. Dimming the light won't show more details but only turn the white color into the grey color. If the same scene is recorded as the high dynamic range image, reducing the exposure will be able to presents more details in the area previously shown as the white color.

The traditional method of high dynamic range image synthesis usually uses the fixed exposure values to shoot several images of the same scene. Images in different exposure conditions are combined to integrate the image dynamic status of the scene, and the difference of the exposure value of each image ranges from 1 to 2 exposure compensations or fewer. Because the dynamics of each image is limited, such traditional method requires more images to synthesize the high dynamic range image. A common camera can not process more than three images in the short period due to the limited processing capability. Therefore, the present technology selects two or three images with fixed exposure compensation to synthesize the high dynamic range image. However, an expected high dynamic range image can't always be retrieved because the appropriate exposure compensation value of the scene can not be set for image shooting or image processing. Thus, developing an ideal image capturing device and an image synthesis method to synthesize a high dynamic range image is an emerging issue in the market.

SUMMARY

A primary object of the present invention is to provide an image capturing device and image synthesis method thereof, in order to overcome the problem of processing time and image quality attributed to the synthesis of different exposure compensation image in the previous technology.

According to an object of the present invention, an image capturing device is disclosed, comprising an image capturing module, an exposure module, and a processing module. The image capturing module is used to capture a high bit-depth scene image corresponding to a scene. The exposure module is used to meter the light of the scene to generate a plurality of histograms. The processing module is used to calculate a plurality of discrete values of different exposure conditions of the high bit-depth scene image based on the plurality of histograms. The high bit-depth scene image is then processed by the processing module to generate at least two low bit-depth temporary images in different brightness conditions based on at least two highest discrete values, and the at least two low bit-depth temporary images are synthesized by the processing module in different brightness conditions to generate a storage image.

In the present invention, the exposure module preferably generates the plurality of histograms in different exposure conditions by using a plurality of exposure compensations to meter the light of the scene.

In the present invention, the exposure module preferably generates the plurality of histograms in different exposure conditions based on a brightness range.

In the present invention, each discrete value represents a scale of the brightness and the darkness of the high bit-depth scene image in different exposure compensation conditions.

In the present invention, the processing module preferably further comprises a conversion unit which converts the high bit-depth scene image to at least two low bit-depth temporary images in different brightness conditions based on at least two highest discrete values.

In the present invention, the processing module preferably synthesizes each pixel of the same items of the at least two low bit-depth scene image in different brightness conditions and generates the storage image.

In the present invention, the storage image is a high dynamic range (HDR) image.

According to an object of the present invention, an image synthesis method applied to an image capturing device is disclosed, comprising the following steps. First, a high bit-depth scene image of a scene is captured by an image capturing module. The light of the scene are metered to generate a plurality of histograms by an exposure module. A plurality of discrete values of different exposure conditions of the high bit-depth scene image are then calculated based on the plurality of histograms by a processing module. The high bit-depth scene image are processed by the processing module based on the at least two highest discrete values and generating at least two low bit-depth temporary images in different brightness conditions are generated by the processing module. The at least two low bit-depth temporary images in different brightness conditions are synthesized by the processing module to generate a storage image.

In the present invention, this method further comprises a step of using the exposure module to meter the light of the scene to generate the plurality of histograms in different exposure conditions based on a plurality of exposure compensation.

In the present invention, this method further comprises a step of using the exposure module to generate the plurality of histograms in different exposure conditions based on a brightness range.

In the present invention, this method further comprises a step of using a conversion unit of the processing module to convert the high bit-depth scene image to the at least two low bit-depth temporary image in different brightness conditions based on the at least two highest discrete values.

In the present invention, this method further comprises a step of using the processing module to synthesize each pixel of the same items of the at least two low bit-depth temporary image in different brightness conditions and generates the storage image.

In the present invention, each discrete value represents a scale of the brightness and the darkness of the high bit-depth scene image in different exposure compensation conditions.

In the present invention, the storage image is a high bit-depth range image.

According to an object of the present invention, an image capturing device is further disclosed, comprising an image capturing module, an exposure module, a conversion module, and an image synthesizing module. The image capturing module is used to capture a high bit-depth scene image corresponding to a scene. The exposure module is used to meter the light of the scene to generate a plurality of histograms. The processing module is used to calculate a plurality of discrete values of different exposure conditions of the high bit-depth scene image based on the plurality of histograms. The conversion module is used to convert the high bit-depth scene to at least two low bit-depth temporary images in different brightness conditions based on at least two highest discrete values. The image synthesizing module is used to synthesize the at least two low bit-depth temporary image in different brightness conditions to a high dynamic range image.

In the present invention, each discrete value represents a scale of the brightness and the darkness of the high bit-depth scene image in different exposure compensation conditions.

The image capturing device and the image synthesis method according to the present invention have one or more advantages as the following:

(1) According to the image capturing device and the image synthesis method, can meter the light of shooting scene are metered and process brightness analysis is processed while shooting the image. Then, based on the number of images the image capturing module can process, it effectively and dynamically generates low bit-depth temporary images in different exposure value and synthesizes a high dynamic range image. Therefore, the synthesis time of high dynamic range image can be reduced and the image quality of high dynamic range image will be enhanced.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
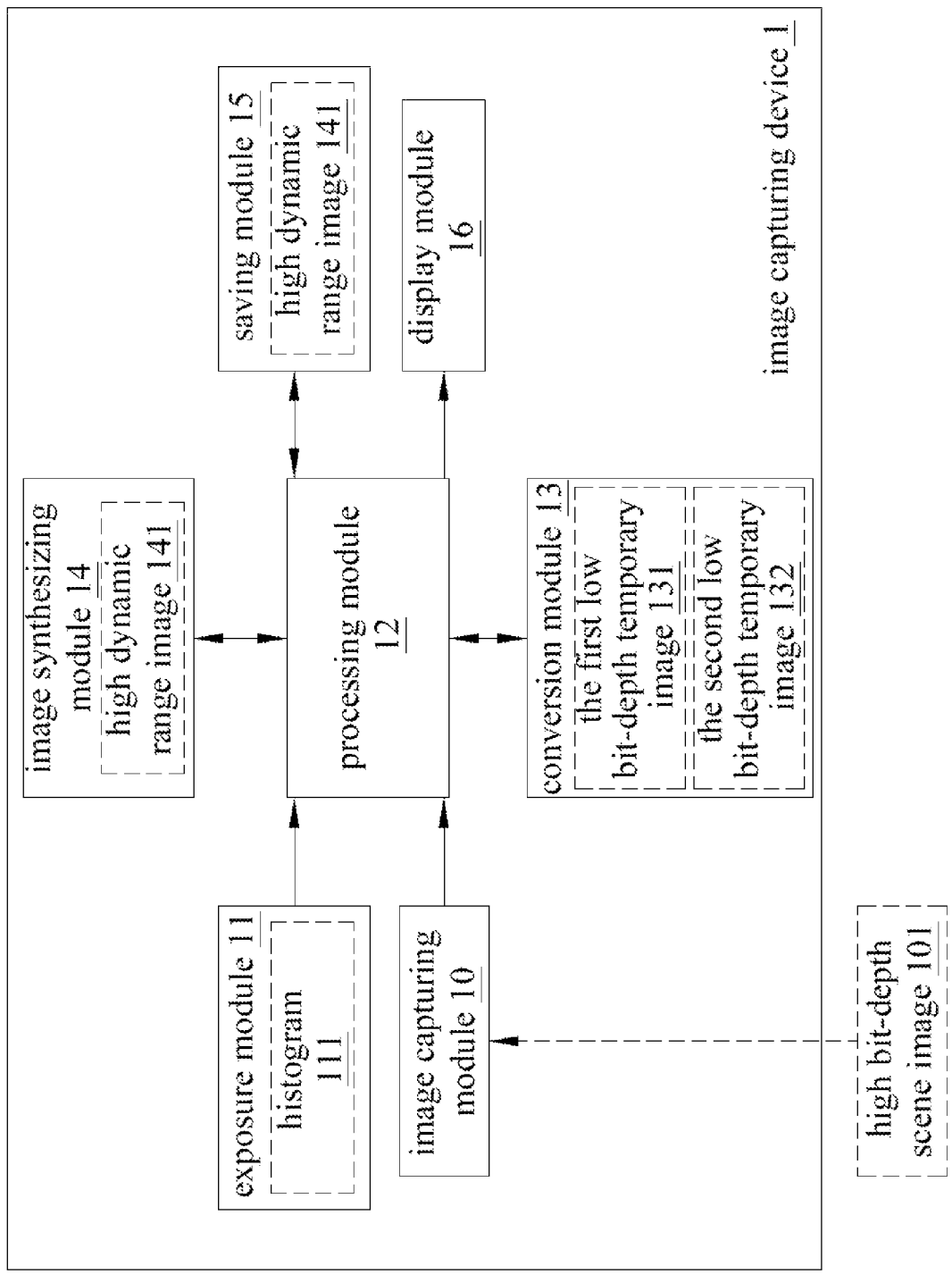
FIG. 1 is a block diagram of an image capturing device according to an embodiment of the present invention.

The present invention will now be described with some preferred embodiments thereof and with reference to the accompanying drawings. For the purpose of being easy to understand, elements that are the same in the preferred embodiments are denoted by the same reference numerals.

The electronic device in the present invention could be the digital camera, the camera phone, the Smartphone, digital video camera or any other portable electronic device with camera function. To further understand technical features of the present invention, the built-in camera is used as the example but it is not limited to this case.

Please refer to FIG. 1 that is a block diagram of an image capturing device according to an embodiment of the present invention. As shown, the image capturing device 1 comprises an image capturing module 10, an exposure module 11, a processing module 12, a conversion module 13, an image synthesizing module 14, a saving module 15 and a display module 16. The image capturing module 10 is used to capture image and generate image data. The image capturing module 10 may comprise a camera lens, complementary metal-oxide-semiconductor (CMOS) or a charge-coupled device (CCD), an analog/digital circuit, an image processor, and so on. The exposure module 11 has the auto exposure mechanism to adjust the aperture size, the shutter time, and ISO value. In addition, it used a plurality of exposure compensation to meter the light of the shooting scene and then generate the histograms 111 in different exposure conditions. The saving module 15, which could be embedded memory, external memory card, or the combination, is used to save image. A display module 16, which could be liquid crystal display (LCD) or touch screen, is used to display image.

The processing module 12 is electronically connected to the image capturing module 10, the exposure module 11, the conversion module 13, the image synthesizing module 14, the saving module 15 and the display module 16. The processing module could be the central processing unit (CPU) or micro processing unit. The processing module 12 calculates a plurality of discrete values of different exposure conditions of the high bit-depth scene image 101 based on the plurality of histograms 111 generated by the exposure module 11. Then, the conversion module 13 converts the high bit-depth scene image 101 to at least two low bit-depth temporary images in different brightness conditions based on at least two highest discrete values. For example, as shown in FIG. 1, the processing module 12 controls the conversion module 13 to process the high bit-depth scene image 101 and generate the first low bit-depth temporary image 131 and the second low bit-depth temporary image 132.

Therefore, the processing module 12 controls the image synthesizing module 14 to synthesize the at least two low bit-depth temporary images in different brightness conditions (such as the first low bit-depth temporary image 131 and the second low bit-depth temporary image 132) and generate a high dynamic range image 141 saved in the saving module 15. In addition, the processing module 12 controls the display module 16 to display the high dynamic range image 141. Moreover, users who are familiar with this can combine function modules mentioned above to an integrated module or divide it into each function units based on the design.

Figure 2:
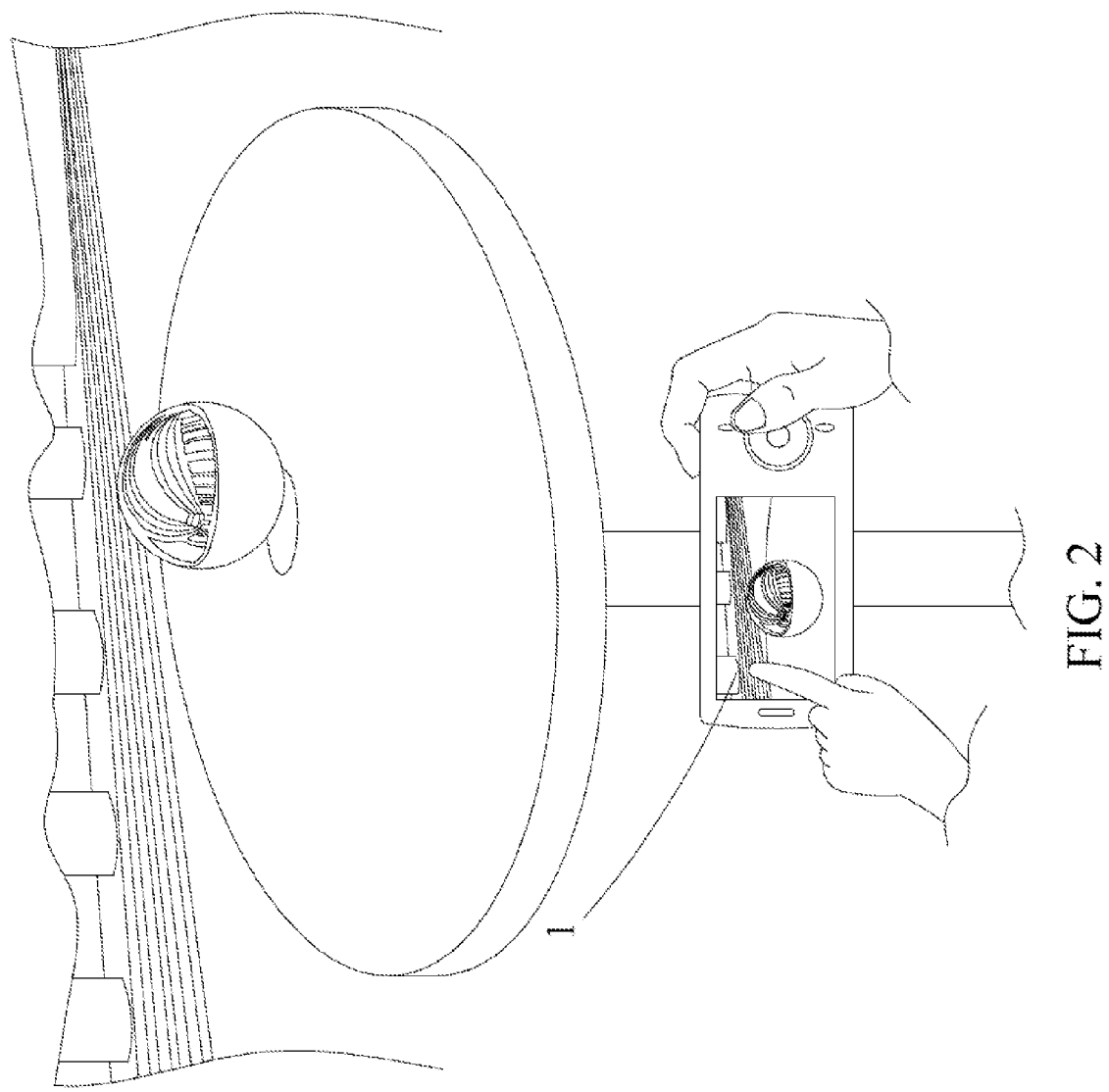
FIG. 2 is a schematic diagram of an image capturing device according to an embodiment of the present invention.
Figure 3:
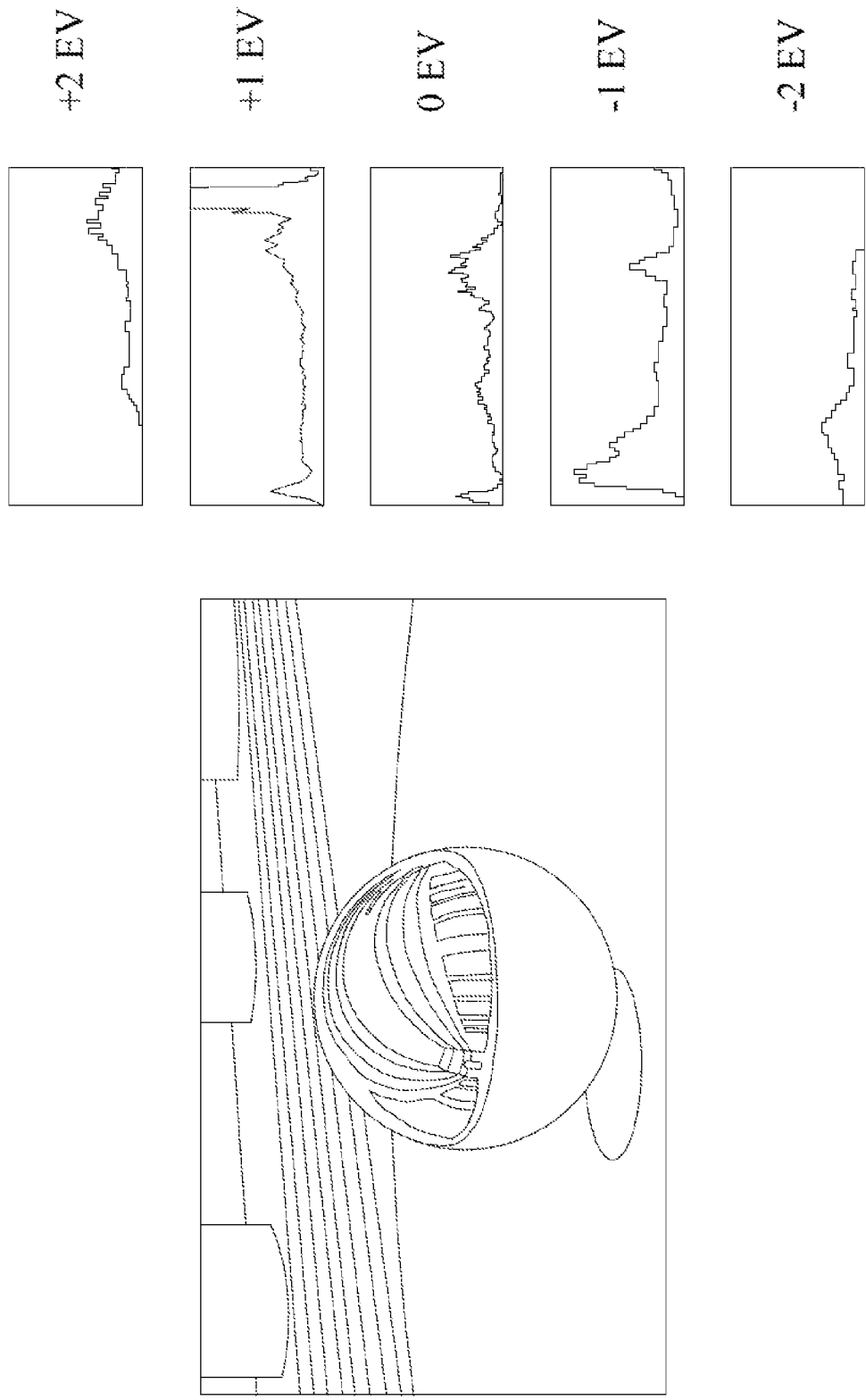
FIG. 3 is a schematic diagram of the histogram of the image of the image capturing device according to an embodiment of the present invention.

Please also refer to FIG. 2 that is a schematic diagram of an image capturing device according to an embodiment of the present invention. As shown, in the process of using the image capturing device 1 to capture the image, users can use the auto exposure (AE) adjustment mechanism of the exposure module 11 to meter the light of the scene and calculate the histograms 111 of the scene in different exposure conditions when the image capturing module 10 captures a high bit-depth scene image 101 corresponding to the scene. In this embodiment, the exposure module 11 uses five exposure compensations as +2 EV, +1 EV, 0 EV, −1 EV, and −2 EV to meter the light of the scene through the auto exposure adjustment mechanism. Therefore, the exposure module 11 can retrieve histograms 111 (as shown in FIG. 3) in different exposure conditions while the image capturing module 10 captures a high bit-depth scene image 101. Next, the processing module 12 calculates the entropy of the high bit-depth scene image 101 in specific exposure compensation conditions based on the histograms 111. Higher entropy means that the high bit-depth scene image 101 in specific exposure compensation conditions covers a larger effective dynamic range. That said, the range between the brightness and the darkness is large.

Please also refer to Table. 1 that is the entropy corresponding to the different exposure compensation. As shown, the entropy of the exposure compensation conditions +2 EV, +1 EV, 0 EV, −1 EV, and −2 EV are 3.31, 4.01, 3.75, 3.83, and 2.96 respectively. Based on the previous statement, the effective dynamic ranges covered by the high bit-depth scene image 101 in specific exposure compensation conditions are +1 EV, −1 EV, 0 EV, +2 EV, and −2 EV in the descending order. Thus, the processing module 12 can control the conversion module 13 to process the high bit-depth scene image 101 based on the processing time or the number of the synthesizing image of the high dynamic range image which is set in the primary setting of the image capturing device 1. (The primary setting can be dynamically modified to different primary values based on the need of users or manufacturers.) For example, the number of the synthesizing images of the high dynamic range image in the primary setting are two lower bit-depth temporary images. (In the embodiment, there are two synthesizing images in the primary setting, but the number of the synthesizing images of this invention is not limited to two.) The conversion module 13 can process the high bit-depth scene image 101 that the image capturing module 10 captures to generate +1 EV first low bit-depth temporary image 131 and −1 EV second low bit-depth temporary image 132 based on the entropy of the five exposure compensations.

TABLE 1

The Entropy corresponding to the different exposure compensations

| Exposure compensation | Entropy |
|---|---|
| +2 | 3.31 |
| +1 | 4.01 |
| 0 | 3.75 |
| −1 | 3.83 |
| +2 | 2.96 |

The high bit-depth scene image 101 captured by the image capturing device 1 can be a 12 or 14 bits RAW image. That said, it is the raw data image with the least image processing, and the brightness level is 4096 (2^12) or 16,384 (2^14) to record the brightness of each pixel. In this embodiment, the conversion module 13 can convert the 12 or 14 bits scene image 101 with the higher degree of color hue, saturation, brightness, and resolution to +1 EV 8 bits temporary image 131 and −1 EV 8 bits temporary image 132 in 256 (2^8) brightness level based on the entropy of the five exposure compensations and by using the method of bit shifting. Also, it can combine the converting method of the 8 bits GIF format image generated by Lempel-Ziv-welch Encoding (LZW) or the converting method of the 8 bits JPEC format image generated by Discrete Cosine Transform (DCT).

Figure 4:
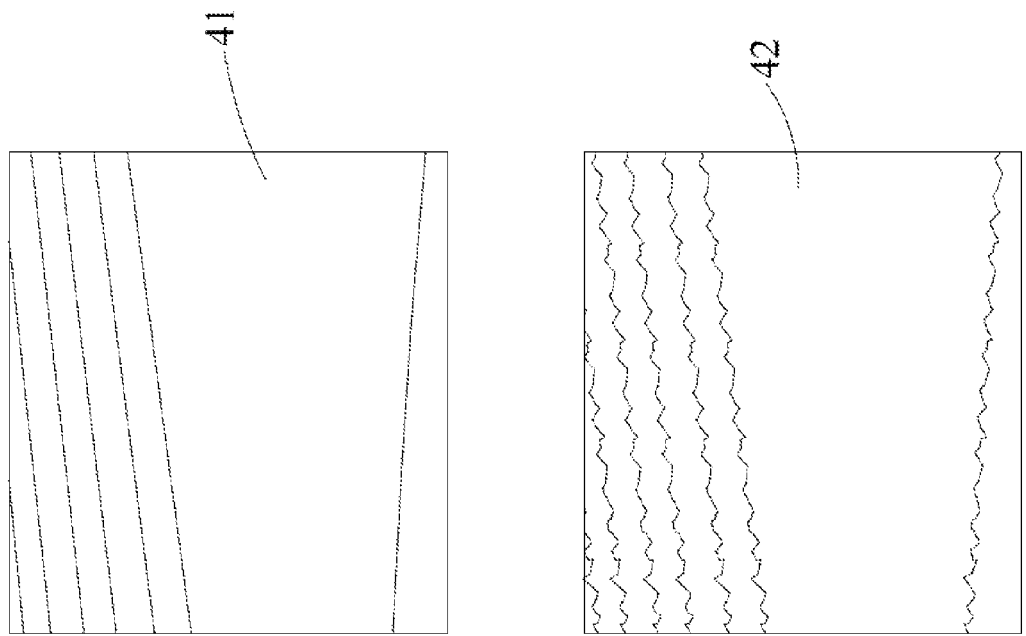
FIG. 4 is a schematic diagram of the high/low bit-depth image conversion of the image capturing device according to the embodiment of the present invention.
Figure 4:
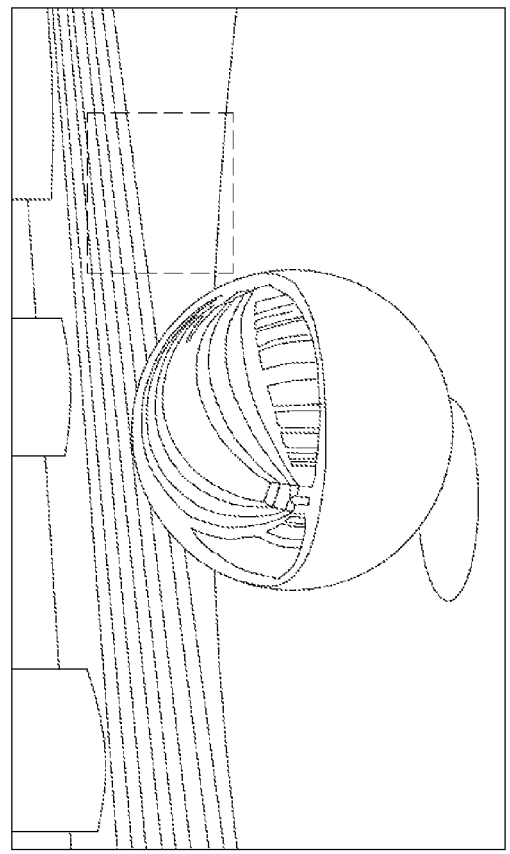

Please also refer to FIG. 4 that is a schematic diagram of the high/low bit-depth image conversion of the image capturing device according to the embodiment of the present invention. As shown in the figure, the upper right side and the lower right side represent one part of a high bit-depth image 41 and one part of a lo bit-depth image 42 respectively. The color hue, saturation, brightness, and resolution of high bit-depth image are usually higher than that of the low bit-depth image (This schematic diagram only shows the difference in resolution). However, while a common display module displays the low bit-depth image, users are less likely to tell the difference mentioned above. Therefore, considering the application in the practice, the conversion module 13 can both maintain the definition of the image and save much time for image processing. Additionally, users with common sense in the field should understand that the embodiment of the bit shifting in the previous statement should be considered as the example but not the limitation.

Figure 5:
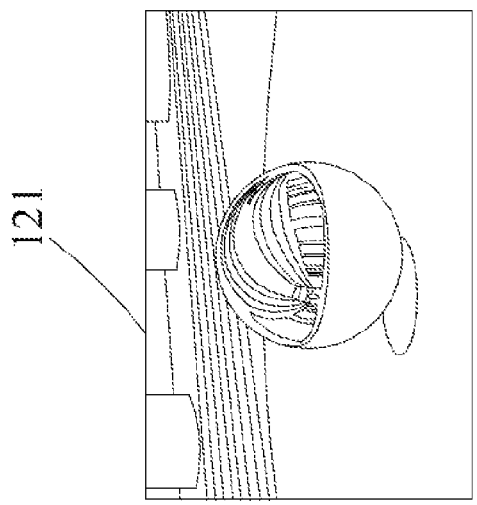
FIG. 5 is a synthesis schematic diagram of the high dynamic range image of the image capturing device according to the embodiment of the present invention.
Figure 5:
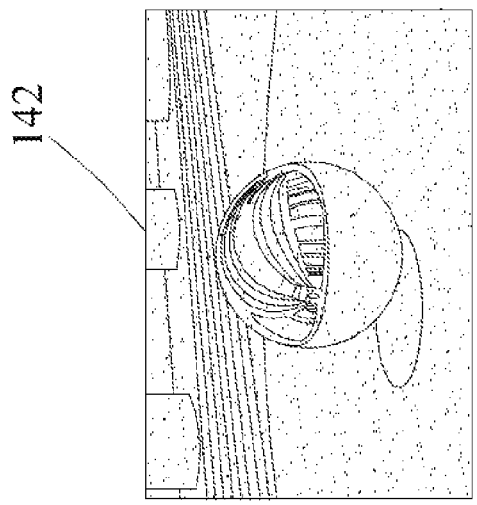
Figure 5:
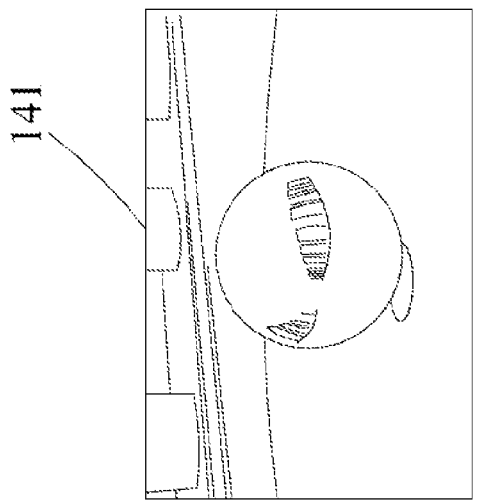

Please also refer to FIG. 5 that is a synthesis schematic diagram of the high dynamic range image of the image capturing device according to the embodiment of the present invention. As shown, the processing module 12 synthesizes the +1 EV first low bit-depth temporary image 131 and the −1 EV second low bit-depth temporary image 132 to generate a high dynamic range image 141 and save it in the saving module 15. Lastly, the display module 16 displays the high dynamic range image 141.

As mentioned above, while the primary setting sets two temporary images for high dynamic range image synthesis, the processing module 12 generates the +1 EV first low bit-depth temporary image 131 and the −1 EV second low bit-depth temporary image 132 based on the combination of the exposure compensations with the largest entropy, which represents the largest effective dynamic range of the high bit-depth scene image 101 in the exposure compensation condition. Then, the processing module 12 synthesizes each pixel of the same items of the first low bit-depth temporary image 131 and the second low bit-depth temporary image 132 in different brightness conditions to generate the high dynamic range image with the largest dynamic range. That said, users can optimize the dynamics and details of the synthesized high dynamic range image by choosing the best exposure parameter while the shooting condition is limited.

It is worth mentioning that the image capturing device 1 can further process the brightness range of the high bit-depth scene image 101. Like what was mentioned in the previous statement, if users are interested in the information with the brightness from 64 to 192, users can control the processing module 12 through an operation module (not shown in the figure) to calculate the histogram 111 in that brightness range and find the best combination of the exposure. Later, the processing module 12 processes the high bit-depth scene image 101 to at least two low bit-depth temporary images 131 and 132 in different brightness conditions and then synthesizes the high dynamic range image. Lastly, a high dynamic range image 141 with the brightness range from 64 to 192 is generated.

Besides, users in the field should understand that while metering the light by the auto exposure adjustment mechanism, user can use 0.3 or other unit but not necessary one unit as the interval for metering the light of the exposure compensation of the auto exposure adjustment. The entropy of the image in specific exposure compensation conditions can be represented as other discrete values or statistical values. The embodiment in the previous statement should be considered as the example but not the limitation.

Figure 6:
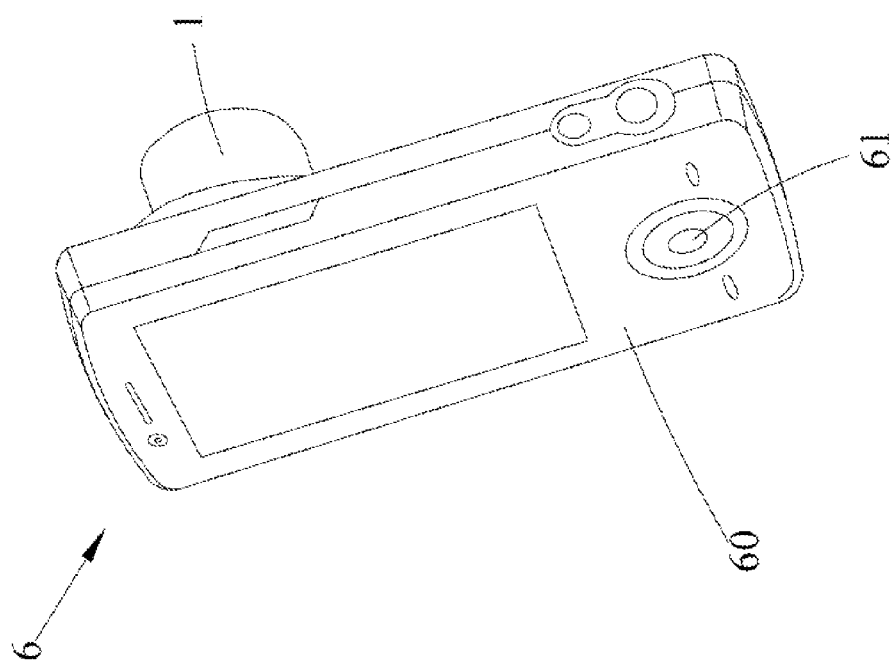
FIG. 6 is a schematic diagram of an electronic device with the image capturing function according to an embodiment of the present invention.

Please also refer to FIG. 6 that is a schematic diagram of an electronic device with the image capturing function according to an embodiment of the present invention. As shown in the figure, the electronic device 6 comprises a main body 60, an input device 61, and an image capturing device 1. The image capturing device 1 is sited on the main body 60 and electronically connected to the input device 61. The image capturing device 1 comprises the image capturing module, the exposure module, the processing module, the conversion module, the image synthesizing module, the saving module, and the display module. The detail description of the image capturing device has been mentioned previously, however, it is worth mentioned that the electronic device 6 in the present invention could be the digital camera, the multi-media player with camera function, the built-in camera cell phone, Smartphone, the navigator, the tablet PC with camera function, or the PDA.

In this embodiment, the example of the electronic device 6 of this invention is Smartphone in which the image capturing device 1 of this invention can be embedded for shooting. Therefore, users can use the input device 61 (such as the touch screen or the button) of the Smartphone while shooting the high dynamic range image. Then, the electronic device 6 will immediately process operations mentioned above as metering the light of the auto exposure, calculating the entropy, converting high and low bit-depth image, and synthesizing the high dynamic range image. It largely shortens the synthesizing time of the high dynamic range image and enhances the quality of the image synthesized. The Smartphone disclosed in this embodiment is for the example but not the limitation. Users with general knowledge in this field should be able to easily replace other device to go with the image capturing device of this invention.

Despite the fact that while explaining the image capturing device of this invention, the image synthesis method of the image capturing device of this invention has also been illustrated. To be clear, a flowchart is showed for detailed explanation.

Figure 7:
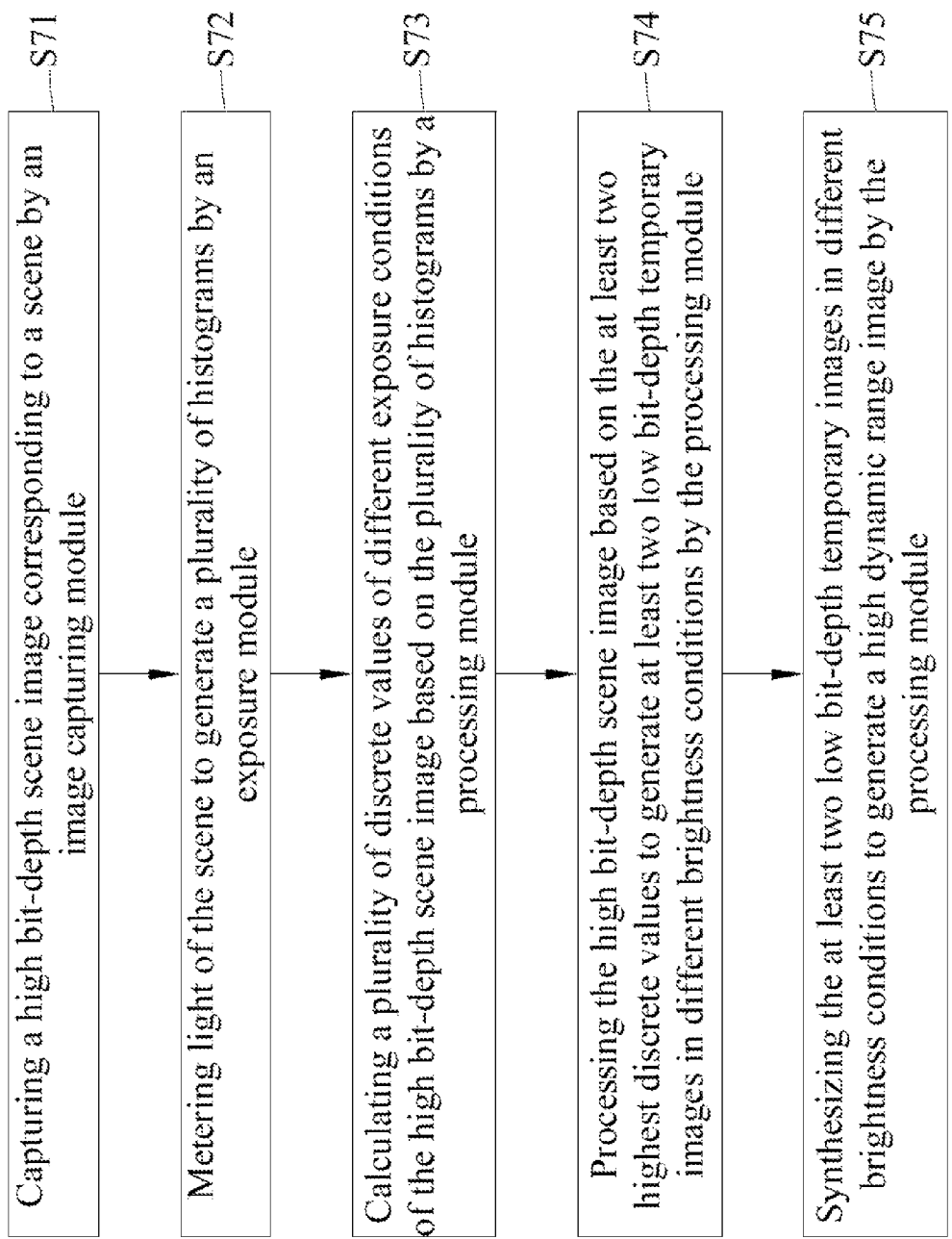
FIG. 7 is a flowchart of the image synthesis method of this invention.

Please refer to FIG. 7 that is a flowchart of the image synthesis method of this invention. As shown, the image synthesis method of this invention, which is applied to an image capturing device, is disclosed. The image capturing device comprises an image capturing module, an exposure module, a processing module, a conversion module, an image synthesizing module, a saving module, and a display module. The image synthesis method of the image capturing device comprises the following steps: (S71) capturing a high bit-depth scene image corresponding to a scene by an image capturing module; (S72) metering light of the scene to generate a plurality of histograms by an exposure module; (S73) calculating a plurality of discrete values of different exposure conditions of the high bit-depth scene image based on the plurality of histograms by a processing module; (S74) processing the high bit-depth scene image based on the at least two highest discrete values to generate at least two low bit-depth temporary images in different brightness conditions by the processing module; and (S75) synthesizing the at least two low bit-depth temporary images in different brightness conditions to generate a high dynamic range image by the processing module.

Because the detailed description and implementation method of the image synthesis method of the image capturing device of this invention have been described in the previous section of the image capturing device and the electronic device of this invention, it will not be stated.

In sum, while shooting the image, the image capturing device and the image synthesis method can meter the light of shooting scene and process brightness analysis. Then, based on the number of images the image capturing module can process, it effectively and dynamically generates low bit-depth temporary image in different exposure value and synthesizes a high dynamic range image. Thus, it will reduce the synthesis time of high dynamic range image and enhance the image quality of high dynamic range image. Therefore, the appended claims are intended to encompass within their scope of all such changes and modifications as are within the true spirit and scope of the exemplary embodiment(s) of the present invention.

What is claimed is:

1. An image capturing device, comprising:
an image capturing module capturing and then generating a high bit-depth scene digital image corresponding to a scene;
an exposure module metering light of the scene to generate a plurality of histograms; and
a processing module calculating a plurality of discrete values of different exposure conditions of the high bit-depth scene digital image based on the plurality of histograms, processing the high bit-depth scene digital image based on at least two highest discrete values to generate at least two low bit-depth temporary digital images in different brightness conditions, and synthesizing the at least two low bit-depth temporary digital images in different brightness conditions to generate a storage image;
wherein the exposure module meters the light of the scene based on a plurality of exposure values to generate the plurality of histograms in different exposure conditions.

2. The image capturing device as recited in claim 1, wherein the exposure module generates the plurality of histograms in different exposure conditions based on a brightness range.

3. The image capturing device as recited in claim 1, wherein the processing module further comprises a conversion unit converting the high bit-depth scene digital image to the at least two low bit-depth temporary digital images in different brightness conditions based on the at least two highest discrete values.

4. The image capturing device as recited in claim 1, wherein the processing module synthesizes each pixel of the same items of the at least two low bit-depth scene digital images in different brightness conditions to generate the storage image.

5. An image synthesis method which applies to an image capturing device, comprising the following steps:
capturing and then generating a high bit-depth scene digital image corresponding to a scene by an image capturing module;
metering light of the scene to generate a plurality of histograms by an exposure module;
calculating a plurality of discrete values of different exposure conditions of the high bit-depth scene digital image based on the plurality of histograms by a processing module;
processing the high bit-depth scene digital image based on the at least two highest discrete values to generate at least two low bit-depth temporary digital images in different brightness conditions by the processing module; and synthesizing the at least two low bit-depth temporary digital images in different brightness conditions to generate a storage image by the processing module;

wherein the light of the scene is metered based on a plurality of exposure values to generate the plurality of histograms in different exposure conditions by the exposure module.

6. The image synthesis method as recited in claim 5, further comprising the following step:

generating the plurality of histograms in different exposure conditions based on a brightness range by the exposure module.

7. The image synthesis method as recited in claim 5, further comprising the following step:

converting the high bit-depth scene digital image to the at least two low bit-depth temporary digital image in different brightness conditions based on the at least two highest discrete values by a conversion unit of the processing module.

8. The image synthesis method as recited in claim 5, further comprising the following step:

synthesizing each pixel of the same items of the at least two low bit-depth temporary digital images in different brightness conditions to generate the storage image by the processing module.

9. An image capturing device, comprising:

an image capturing module capturing and then generating a high bit-depth scene digital image corresponding to a scene;

an exposure module metering light of the scene to generate a plurality of histograms;

a processing module calculating a plurality of discrete values of different exposure conditions of the high bit-depth scene digital image based on the plurality of histograms;

a conversion module converting the high bit-depth scene digital image to at least two low bit-depth temporary digital image in different brightness conditions based on at least two highest discrete values; and an image synthesizing module synthesizing the at least two low bit-depth temporary digital image in different brightness conditions to generate a high dynamic range image;

wherein the exposure module meters the light of the scene based on a plurality of exposure values to generate the plurality of histograms in different exposure conditions.

10. The image capturing device as recited in claim 9, wherein each of the discrete values represents a scale of brightness and darkness of the high bit-depth scene digital image in different exposure compensation conditions.

* * * * *